Sept. 6, 1955     W. E. ANDERSON     2,717,273
BUSHING FOR BATTERIES AND THE LIKE
Filed April 14, 1953
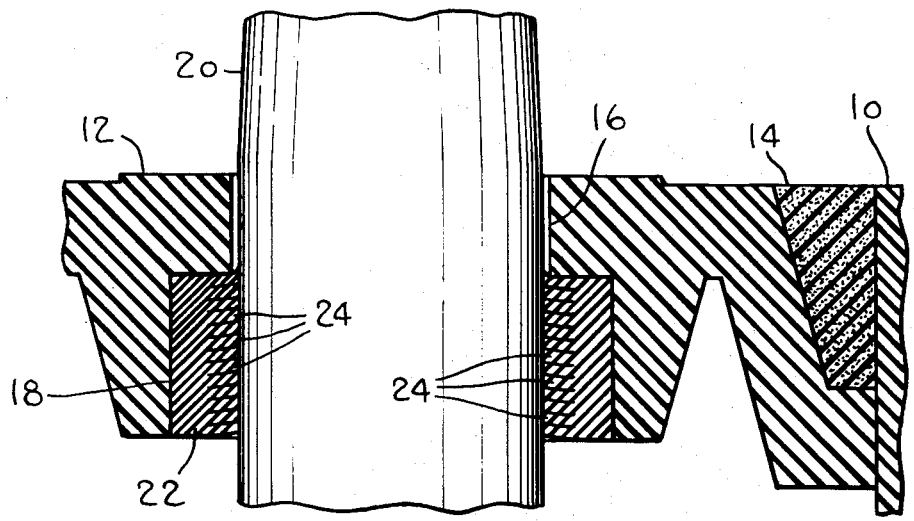
Fig. 1
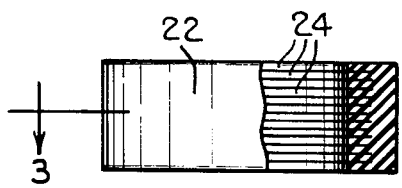
Fig. 2
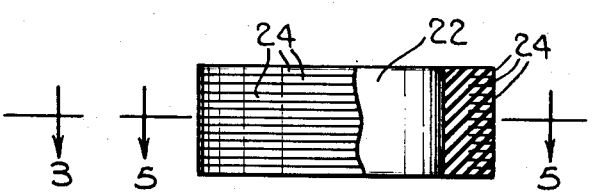
Fig. 4
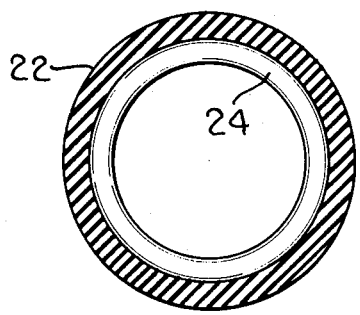
Fig. 3
Fig. 5
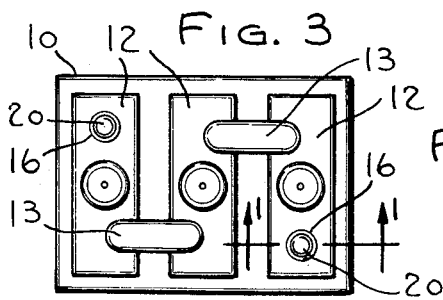
Fig. 6
INVENTOR.
WALTER E. ANDERSON
BY John W. Michael
ATTORNEY

United States Patent Office 2,717,273
Patented Sept. 6, 1955

2,717,273
BUSHING FOR BATTERIES AND THE LIKE

Walter E. Anderson, Fox Point, Wis., assignor to Globe-Union Inc., Milwaukee, Wis., a corporation of Delaware Application April 14, 1953, Serial No. 348,751

2 Claims. (Cl. 136—168)

This invention relates to improvements in bushings, particularly those forming a seal between battery covers and posts.

It is desirable to obtain a relatively tight fit between such bushings and posts to not only prevent leakage of the electrolyte but to also form a strong mechanical lock between the cover and such posts. However, such union must not require unusual force to press the cover and bushings onto the posts.

It is an object of this invention therefore to provide a bushing of this type which, when seated in the cover, may be easily pressed onto the post to make a tight seal therewith, and a mechanical lock between the cover and such post.

This object is obtained by providing the inner wall of a resilient bushing with a multiplicity of encircling slits. These slits divide such wall into a multiplicity of inwardly facing flexible flanges. Such flanges will flex upwardly relative to the body of the bushing as such bushing, while seated in a cover, is pressed onto a post and thus lessen the force required to so press the bushing into place. However, a tight seal is accomplished between the bushing and post because each flange will have its lower inner corner in snug complete ring-like contact with the post. The multiplicity of edge-like seals thus accomplished afford a better overall seal than the single large area seal obtained by conventional bushings. Furthermore each flange, being flexed upwardly, engages the post with increasing frictional resistance if force is applied to move the cover and bushing upwardly of the post. Hence a strong mechanical lock is formed between cover and post.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is an enlarged cross-sectional view taken on the line 1—1 of Fig. 6 showing a bushing embodying the present invention placed between the cover and post of a storage battery;

Fig. 2 is a view in side elevation, with part broken away and shown in section, of the bushing of Fig. 1 removed from such cover and post;

Fig. 3 is a sectional view taken on the line 3—3 of Fig. 2;

Fig. 4 is a view in side elevation, with part broken away and shown in section, of the bushing of Fig. 2 inverted so that the normally inner wall is on the outside thereof to illustrate one method of making such bushing;

Fig. 5 is a sectional view taken on the line 5—5 of Fig. 4; and

Fig. 6 is a top plan view of a storage battery in which bushings embodying the present invention are positioned between the cover and posts thereof.

The bushing embodying the present invention, for the sake of illustration, is shown installed between a lead post of a storage battery and an opening in the cover of such battery through which the post extends. While such bushing is particularly adapted for this type of use, it may nevertheless be used to form a fixed seal between any shaft-like member and another member having an opening through which such shaft projects.

Covers 12 for each cell of a battery 10 are set within the casing of the battery and held in place in the usual manner by cement 14. Each cell cover has a pair of openings through which project lead posts connected with the battery plates. Only one such post 20 is illustrated in detail in the drawings and described herein. This post is one of the main terminals of the battery. Other posts are smaller and are used to interconnect adjacent cells. However, each post has a bushing between it and its cell covering substantially like the one herein described. Only one opening 16 in the cover is shown and described in detail herein. The other openings are the same except for dimensional differences. The opening 16 is widened at the lower part thereof to form a bushing seat 18.

In the conventional battery a rubber bushing of hollow cylindrical shape is seated in this seat and its inner wall frictionally engages the post 20 when the cover is put in place. The inner diameter of the conventional bushing is enough less than the outer diameter of the post to make a press fit therebetween. However, so much force is needed to press the cover and bushing down onto the post that damage is often done to the battery plates.

To overcome such disadvantage, this invention utilized a rubber bushing 22 of conventional shape fitted in the seat 18. The inner wall of bushing 22 has a plurality of spaced slits extending outwardly into the body of the bushing to form a multiplicity of ring-like inwardly directed flanges 24. The depth of these flanges is substantially half the thickness of the body of the bushing and their thickness is approximately $\frac{1}{32}''$. During the assembly of the cover and bushing the inner face of each of these flanges is engaged by the post 20 and the frictional resistance generated will flex each flange upwardly as is illustrated in Fig. 1. Because of this the amount of force necessary to assemble the cover 12 and bushing 22 onto the post 20 will be much less than that required to so assemble a cover and conventional bushing. However, the seal between the bushing 22 and the post 20 becomes even more effective than the seal created by the conventional bushing. The reason for this is that the lower inner corner of each flange 24 forms a ring with narrow small contact area with the post. This in turn creates a more perfect fit for such contact area. As the overall seal is made up of a large number of smaller more perfect seals, the total overall sealing effectiveness of the improved bushing is greater than that of a same sized conventional bushing. Because the flanges 24 have been flexed upwardly as the cover and bushing are fitted onto the post, the gripping action restraining removal of the bushing and the cover is greater. This creates a strong mechanical joint and helps keep the cover firmly in place.

Although only one embodiment of the invention is shown and described herein, it will be understood that this application is intended to cover such changes or modifications as come within the spirit of the invention or scope of the following claims.

I claim:

1. A bushing for forming a seal between a lead post and the cover of a storage battery, said cover having an opening for said post and a bushing seat, comprising a hollow rubber cylinder having an outer wall adapted to fit in said seat, and an inner wall having an inner diameter smaller than the outer diameter of said lead post, said inner wall having a multiplicity of spaced slits forming therebetween ring-like flanges, said flanges having flat inner edges providing ninety degree corners between said inner edges and the sides of said flanges, said flanges being in side to side contact and flexed out of their normal unstressed position when said bushing is in position on said post to bring said corners into engagement with said post.

2. A bushing as claimed in claim 1 in which said flanges are flexed toward the outer end of said post.

References Cited in the file of this patent

UNITED STATES PATENTS

| | | |
|---|---|---|
| 1,680,038 | Dunzweiler | Aug. 7, 1928 |
| 1,926,197 | Durr | Sept. 12, 1933 |
| 2,148,738 | Feldtkeller | Feb. 28, 1939 |
| 2,182,034 | Oberstadt | Dec. 5, 1939 |
| 2,643,147 | Funkhouser et al. | June 23, 1953 |